US012572098B2

(12) United States Patent
Watanabe et al.

(10) Patent No.: US 12,572,098 B2
(45) Date of Patent: Mar. 10, 2026

(54) PRESSURE SWITCHING MECHANISM AND IMAGE FORMING APPARATUS

(71) Applicants: Natsuki Watanabe, Kanagawa (JP); Hitoshi Fujiwara, Kanagawa (JP); Shigeo Nanno, Kanagawa (JP); Yuusuke Furuichi, Kanagawa (JP)

(72) Inventors: Natsuki Watanabe, Kanagawa (JP); Hitoshi Fujiwara, Kanagawa (JP); Shigeo Nanno, Kanagawa (JP); Yuusuke Furuichi, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 74 days.

(21) Appl. No.: 18/183,651

(22) Filed: Mar. 14, 2023

(65) Prior Publication Data

US 2023/0297017 A1 Sep. 21, 2023

(30) Foreign Application Priority Data

Mar. 16, 2022 (JP) ................................ 2022-041914

(51) Int. Cl.
*G03G 15/20* (2006.01)

(52) U.S. Cl.
CPC ..... *G03G 15/2064* (2013.01); *G03G 15/2032* (2013.01)

(58) Field of Classification Search
CPC ....................... G03G 15/2064; G03G 15/2032
See application file for complete search history.

(56) References Cited

U.S. PATENT DOCUMENTS 5,539,509 A * 7/1996 Tomoe ............... G03G 15/2053 399/331
9,568,865 B2 * 2/2017 Furuichi ............ G03G 15/2017
(Continued)

FOREIGN PATENT DOCUMENTS

JP 2008164781 A 7/2008
JP 2008216619 A 9/2008
(Continued)

OTHER PUBLICATIONS

English translation of JP_6503800.*
Japanese Office Action issued on Nov. 28, 2025, in Japanese Patent Application No. 2022-041914.

*Primary Examiner* — Arlene Heredia Ocasio
(74) *Attorney, Agent, or Firm* — Harness, Dickey & Pierce, P.L.C.

(57) ABSTRACT

A pressure switching mechanism includes a rotatable support, a biasing member, and a switching rotation member. The rotatable support rotates around a first rotation shaft to support a contact member such that the contact member is movable in a direction toward or away from a contacted member. The biasing member has one end connected to a biased portion of the rotatable support, which is located on a side opposite the first rotation shaft with respect to a virtual line passing through a contact portion between the contact member and the contacted member, and applies a biasing force to the rotatable support. The switching rotation member is connected to another end of the biasing member opposite the one end of the biasing member, rotates around a second rotation shaft, and has a rotation operating end which is on a side opposite the second rotation shaft with respect to the virtual line.

13 Claims, 6 Drawing Sheets

(56) References Cited

U.S. PATENT DOCUMENTS

| | | | | |
|---|---|---|---|---|
| 10,990,049 | B2 * | 4/2021 | Fujiwara ............ | G03G 15/2064 |
| 11,009,817 | B2 * | 5/2021 | Fujiwara ............ | G03G 15/2032 |
| 11,927,900 | B2 * | 3/2024 | Ogiso ................ | G03G 15/2028 |
| 2008/0069589 | A1 * | 3/2008 | Chang ................ | G03G 15/2035 399/122 |
| 2008/0219725 | A1 | 9/2008 | Saiki | |
| 2011/0170919 | A1 | 7/2011 | Fujiwara et al. | |
| 2013/0064585 | A1 | 3/2013 | Watanabe et al. | |
| 2014/0294442 | A1 * | 10/2014 | Yoshikawa ........ | G03G 15/2064 399/328 |
| 2017/0343942 | A1 | 11/2017 | Okamoto et al. | |
| 2020/0033764 | A1 | 1/2020 | Kajiyama et al. | |
| 2020/0379384 | A1 * | 12/2020 | Samei ................ | G03G 15/2053 |
| 2022/0066366 | A1 | 3/2022 | Watanabe | |

FOREIGN PATENT DOCUMENTS

| | | | |
|---|---|---|---|
| JP | 2011137931 | A | 7/2011 |
| JP | 2013061535 | A | 4/2013 |
| JP | 2016-170229 | | 9/2016 |
| JP | 2017-021147 | | 1/2017 |
| JP | 2017-215450 | | 12/2017 |

* cited by examiner

PRESSURE SWITCHING MECHANISM AND IMAGE FORMING APPARATUS

CROSS-REFERENCE TO RELATED APPLICATION

This patent application is based on and claims priority pursuant to 35 U.S.C. § 119(a) to Japanese Patent Application No. 2022-041914, filed on Mar. 16, 2022, in the Japan Patent Office, the entire disclosure of which is hereby incorporated by reference herein.

BACKGROUND

Technical Field

The present disclosure relates to a pressure switching mechanism and an image forming apparatus.

Related Art

In the related art, there is known a pressure switching mechanism that switches between pressing and releasing of a contact member with respect to a contacted member.

For example, a support module (pressure switching mechanism) has been proposed that pressing and releasing of a pressure belt (contact member) are switchable with respect to a heating roller (contacted member) of a fixing device.

SUMMARY

In an embodiment of the present disclosure, there is provided a pressure switching mechanism that switches between pressing and releasing of a contact member with respect to a contacted member and includes a rotatable support, a biasing member, and a switching rotation member. The rotatable support rotates around a first rotation shaft to support the contact member such that the contact member is movable in a direction toward or away from the contacted member. The biasing member has one end connected to a biased portion of the rotatable support. The biased portion is located on a side opposite the first rotation shaft with respect to a virtual line when viewed from an axial direction of the first rotation shaft. The virtual line passes through a contact portion between the contact member and the contacted member at the pressing of the contact member with respect to the contacted member and is parallel to a pressing direction in which the contact member presses the contacted member. The biasing member applies a biasing force to the rotatable support to rotate the rotatable support in a direction such that the contact member presses the contacted member. The switching rotation member is connected to another end of the biasing member opposite the one end of the biasing member and rotates around a second rotation shaft between a pressing rotation position to increase the biasing force of the biasing member and a releasing rotation position to decrease the biasing force of the biasing member. The second rotation shaft is parallel to the first rotation shaft. The switching rotation member has a rotation operating end to operate rotation of the switching rotation member. The rotation operating end is on a side opposite the second rotation shaft with respect to the virtual line when viewed from an axial direction of the second rotation shaft at the pressing rotation position.

In another embodiment of the present disclosure, there is provided an image forming apparatus that includes the pressure switching mechanism.

BRIEF DESCRIPTION OF THE DRAWINGS

A more complete appreciation of embodiments of the present disclosure and many of the attendant advantages and features thereof can be readily obtained and understood from the following detailed description with reference to the accompanying drawings, wherein.

Figure 1:
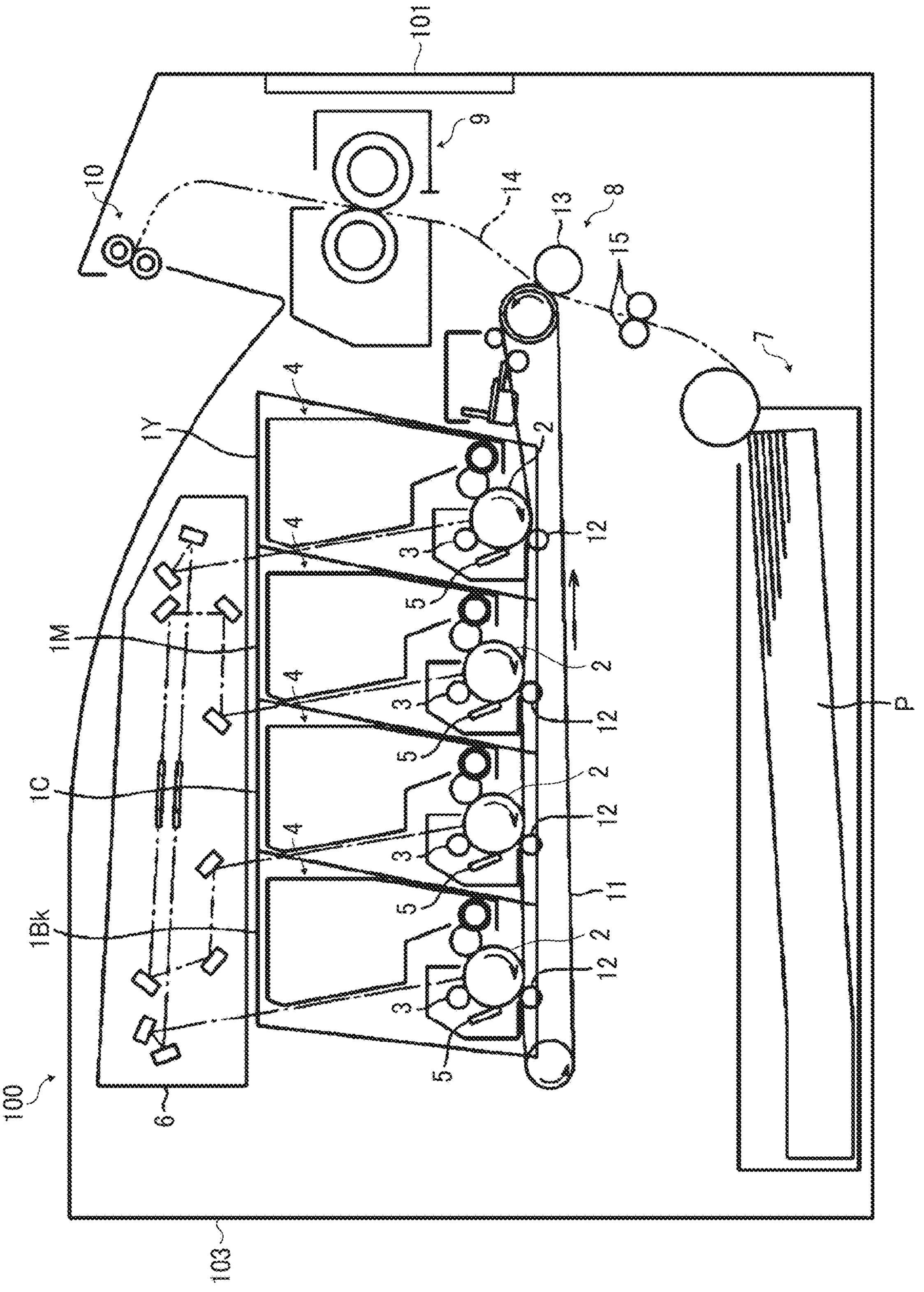
FIG. 1 is a schematic view of an image forming apparatus according to an embodiment of the present disclosure.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

A description is given of a pressure switching mechanism applied to a fixing device of an electrophotographic image forming apparatus, according to an embodiment of the present disclosure. Note that, in the fixing device of the image forming apparatus according to the present embodiment, the pressure switching mechanism is exemplified that switches between pressing and releasing of a fixing belt as a contact member against a pressure roller as a contacted member. However, embodiments of the present disclosure are not limited to this configuration. For example, the present disclosure is also applicable to a pressure switching mechanism that switches between pressing and releasing of any other point (e.g., a conveyance roller pair) at which a contact member contacts a contacted member in an image forming apparatus. The image forming apparatus is not limited to an electrophotographic image forming apparatus and may be a printer, a copier, a facsimile machine, a multifunction peripheral (MFP) having at least two of printing, copying, facsimile, scanning, and plotter functions, or the like.

FIG. 1 is a schematic diagram illustrating a configuration of an image forming apparatus according to an embodiment of the present disclosure. An image forming apparatus 100 according to the present embodiment includes four image forming units 1Y, 1M, 1C, and 1Bk serving as image forming devices. The image forming units 1Y, 1M, 1C, and 1Bk are removably installed in a body 103 of the image forming apparatus 100. The image forming units 1Y, 1M, 1C, and 1Bk have a similar construction except that the image forming units 1Y, 1M, 1C, and 1Bk contain developers in different colors, that is, yellow, magenta, cyan, and black, respectively, which correspond to color separation components for a color image. Specifically, each of the image forming units 1Y, 1M, 1C, and 1Bk includes a drum-shaped photoconductor 2 as a latent image bearer. Each of the image forming units 1Y, 1M, 1C, and 1Bk includes a charging device 3 to charge a surface of the photoconductor 2, a developing device 4 to supply toner as developer to the surface of the photoconductor 2 to form a toner image, and a cleaning device 5 to clean the surface of the photoconductor 2.

The image forming apparatus 100 also includes an exposure device 6 that exposes the surface of each photoconductor 2 to light to form an electrostatic latent image, a sheet feeder 7 that feeds a sheet P as a recording material, and a transfer device 8 that transfers the toner image formed on each photoconductor 2 onto the sheet P. The image forming apparatus 100 also includes a fixing device 9 that fixes the toner image transferred to the sheet P, and a sheet ejection device 10 that ejects the sheet P to the outside of the apparatus.

The transfer device 8 includes an endless intermediate transfer belt 11 serving as an intermediate transferor stretched by a plurality of rollers. The transfer device 8 includes four primary transfer rollers 12 and a secondary transfer roller 13. Each of the four primary transfer rollers 12 serving as a primary transferor transfers the toner image from the corresponding photoconductor 2 onto the intermediate transfer belt 11. The secondary transfer roller 13 serving as a secondary transferor transfers the toner image transferred on the intermediate transfer belt 11 onto the sheet P. The four primary transfer rollers 12 are in contact with the respective photoconductors 2 via the intermediate transfer belt 11. Thus, the intermediate transfer belt 11 contacts each of the photoconductors 2, forming a primary transfer nip therebetween. On the other hand, the secondary transfer roller 13 is in contact with one of the plurality of rollers, around which the intermediate transfer belt 11 is stretched, via the intermediate transfer belt 11. Thus, the secondary transfer nip is formed between the secondary transfer roller 13 and the intermediate transfer belt 11.

The image forming apparatus 100 includes a sheet conveyance passage 14 through which the sheet P fed from the sheet feeder 7 is conveyed. A timing roller pair 15 is disposed between the sheet feeder 7 and the secondary transfer nip (defined by the secondary transfer roller 13) in the sheet conveyance passage 14.

Next, printing operations of the image forming apparatus according to the present embodiment are described below. When the image forming apparatus 100 receives an instruction to start printing, a driver drives and rotates the photoconductor 2 clockwise in FIG. 1 in each of the image forming units 1Y, 1M, 1C, and 1Bk. The charging device 3 charges the surface of the photoconductor 2 uniformly at a high electric potential. Subsequently, the exposure device 6 exposes the surface of each of the photoconductors 2 based on image data created by a document reading device that reads an image on an original or print data instructed by a terminal, thus decreasing the electric potential of an exposed portion on the photoconductor 2 and forming an electrostatic latent image on the photoconductor 2. The developing device 4 supplies toner to the electrostatic latent image formed on the photoconductor 2, forming a toner image thereon.

The toner images formed on the photoconductors 2 reach the primary transfer nips (defined by the primary transfer rollers 12) with the rotation of the photoconductors 2 and are transferred onto the intermediate transfer belt 11 driven and rotated counterclockwise in FIG. 1 successively such that the toner images are superimposed on the intermediate transfer belt 11, forming a full color toner image thereon. Thereafter, the full color toner image formed on the intermediate transfer belt 11 is conveyed to the secondary transfer nip (defined by the secondary transfer roller 13) in accordance with rotation of the intermediate transfer belt 11 and is transferred onto the sheet P conveyed to the secondary transfer nip. The sheet P is supplied from the sheet feeder 7. The timing roller pair 15 temporarily halts the sheet P supplied from the sheet feeder 7. Thereafter, the timing roller pair 15 conveys the sheet P to the secondary transfer nip so that the sheet P meets the full color toner image formed on the intermediate transfer belt 11 at the secondary transfer nip. Thus, the full color toner image is transferred onto and borne on the sheet P. After the toner image is transferred onto the intermediate transfer belt 11, the cleaning device 5 removes residual toner remained on the photoconductor 2 therefrom.

After the full color toner image is transferred onto the sheet P, the sheet P is conveyed to the fixing device 9 to fix the full color toner image onto the sheet P. Thereafter, the sheet ejection device 10 ejects the sheet P to the outside of the image forming apparatus 100, thus finishing a series of printing processes.

Figure 2:
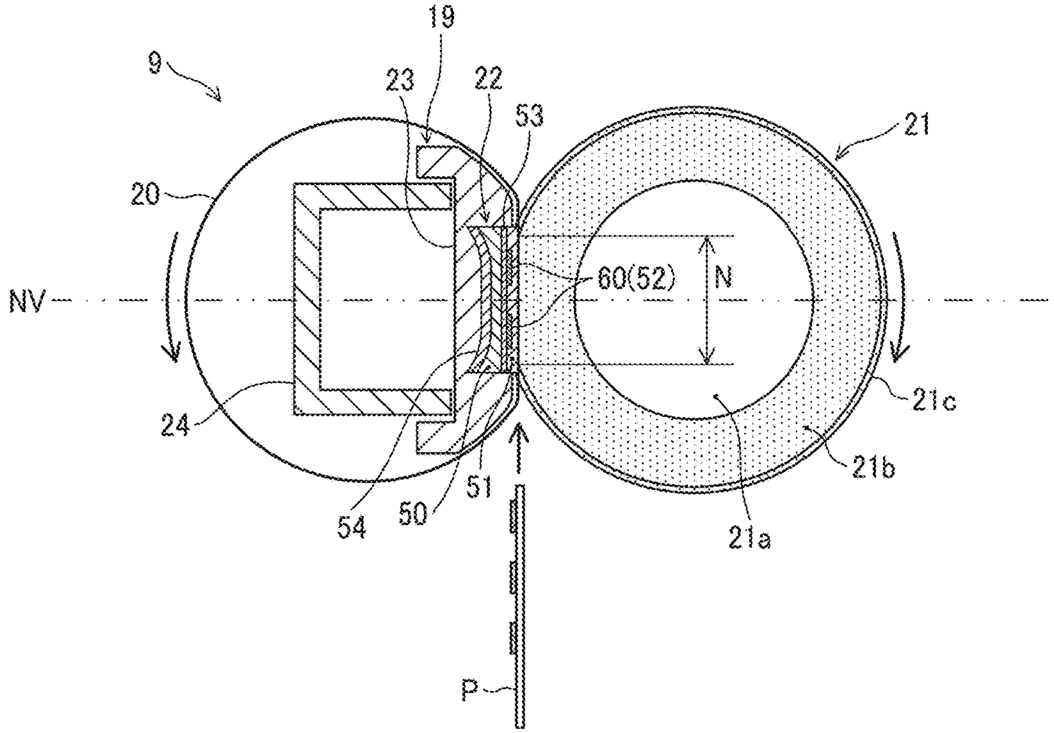
FIG. 2 is a diagram illustrating an internal structure of a fixing device in the image forming apparatus as viewed from a sheet width direction.

Next, a description is given of the fixing device 9 according to the present embodiment. FIG. 2 is a diagram illustrating an internal structure of the fixing device 9 in the image forming apparatus 100 as viewed from the width direction of the sheet P (the width direction of the recording material). The fixing device 9 according to the present embodiment includes a fixing belt 20, a pressure roller 21, and a heating device 19. The fixing belt 20 is an endless belt serving as a fixing member (contact member) and may also be referred to as a fixing sleeve. The pressure roller 21 serving as an opposed member (contacted member) contacts an outer circumferential surface of the fixing belt 20 to form a fixing nip N between the fixing belt 20 and the pressure roller 21. The heating device 19 heats the fixing belt 20. The heating device 19 includes a heater 22 and a heater holder 23. The heater 22 serving as a heating member is a planar or laminated heater and heats the fixing belt 20 from an inner circumferential surface side of the fixing belt 20. The heater holder 23 as a holder holds the heater 22. The heating device 19 also includes a stay 24 as a supporter to support the heater holder 23 across the recording material width direction (the direction perpendicular to the plane on which FIG. 2 is illustrated).

The fixing belt 20 includes, for example, a tubular base that is made of polyimide (PI) and has an outer diameter of 25 mm and a thickness in a range of from 40 μm to 120 μm. The fixing belt 20 further includes a release layer serving as an outermost surface layer. The release layer is made of fluororesin, such as tetrafluoroethylene-perfluoroalkylvinylether copolymer (PFA) and polytetrafluoroethylene (PTFE), and has a thickness of from 5 μm to 50 μm to enhance durability of the fixing belt 20 and facilitate separation of the sheet P from the fixing belt 20. An elastic layer made of rubber having a thickness of from 50 μm to 500 μm may be provided between the base and the release layer. The base of the fixing belt 20 may be made of heat-resistant resin such as polyetheretherketone (PEEK) or metal such as nickel (Ni) and steel use stainless (SUS) stainless steel, instead of polyimide. The inner circumferential surface of the fixing belt 20 may be coated with PI or PTFE as a slide layer.

The pressure roller 21 having, for example, an outer diameter of 25 mm, includes a solid iron core 21*a*, an elastic layer 21*b* formed on the surface of the core 21*a*, and a release layer 21*c* formed on the outer circumferential surface of the elastic layer 21*b*. The elastic layer 21*b* is made of silicone rubber and has a thickness of 3.5 mm, for example. Preferably, the release layer 21*c* is formed by a fluororesin layer having, for example, a thickness of approximately 40 μm on the surface of the elastic layer 21*b* to improve releasability.

The heater 22 extends in a longitudinal direction thereof throughout an entire width of the fixing belt 20 in the width direction of the fixing belt 20. The heater 22 is disposed to contact the inner circumferential surface of the fixing belt 20. The heater 22 may not contact the fixing belt 20 or may be disposed opposite the fixing belt 20 indirectly via a low-friction sheet or the like. However, the heater 22 that contacts the fixing belt 20 directly enhances conduction of heat from the heater 22 to the fixing belt 20. The heater 22 may contact the outer circumferential surface of the fixing belt 20. However, if the outer circumferential surface of the fixing belt 20 is brought into contact with the heater 22 and damaged, the fixing belt 20 may degrade quality of fixing the toner image on the sheet P. Thus, the heater 22 contacts the inner circumferential surface of the fixing belt 20 advantageously.

The heater holder 23 and the stay 24 are disposed inside a loop of the fixing belt 20. The stay 24 is made of a metal channel material and is pressed toward the pressure roller 21 by the pressure switching mechanism described below. The stay 24 supports a stay-side face of the heater holder 23 that faces the stay 24 and is opposite a heater-side face of the heater holder 23 that faces the heater 22. Accordingly, the stay 24 retains the heater 22 and the heater holder 23 such that the heater 22 and the heater holder 23 are not substantially bent by the contact pressure with the pressure roller 21, forming the fixing nip N between the fixing belt 20 and the pressure roller 21.

Since the heater holder 23 is heated to a high temperature by heat from the heater 22, the heater holder 23 is preferably made of a heat resistant material. For example, if the heater holder 23 is made of heat resistant resin having a low thermal conductivity, such as liquid crystal polymer (LCP) and PEEK, the heater holder 23 suppresses conduction of heat thereto from the heater 22, facilitating heating of the fixing belt 20.

The pressure roller 21 and the fixing belt 20 are pressed against each other by a biasing force of a tension spring 27 serving as a biasing member of the pressure switching mechanism described below via the stay 24. Thus, the fixing nip N is formed between the fixing belt 20 and the pressure roller 21. As a driving force is transmitted to the pressure roller 21 from a driver disposed in the body 103 of the image forming apparatus 100, the pressure roller 21 serves as a driving roller that drives and rotates the fixing belt 20. The fixing belt 20 is driven and rotated by the pressure roller 21 as the pressure roller 21 rotates. While the fixing belt 20 rotates, the fixing belt 20 slides over the heater 22. In order to facilitate sliding performance of the fixing belt 20, a lubricant such as oil or grease may be provided between the heater 22 and the fixing belt 20.

When printing starts, the driver drives and rotates the pressure roller 21 and the fixing belt 20 starts rotation in accordance with rotation of the pressure roller 21. As power is supplied to the heater 22, the heater 22 heats the fixing belt 20. After the temperature of the fixing belt 20 reaches a specified target temperature (fixing temperature), as illustrated in FIG. 2, the sheet P bearing an unfixed toner image is conveyed to the fixing nip N between the fixing belt 20 and the pressure roller 21. As a result, the unfixed toner image is heated and pressed to be fixed on the sheet P.

Figure 3:
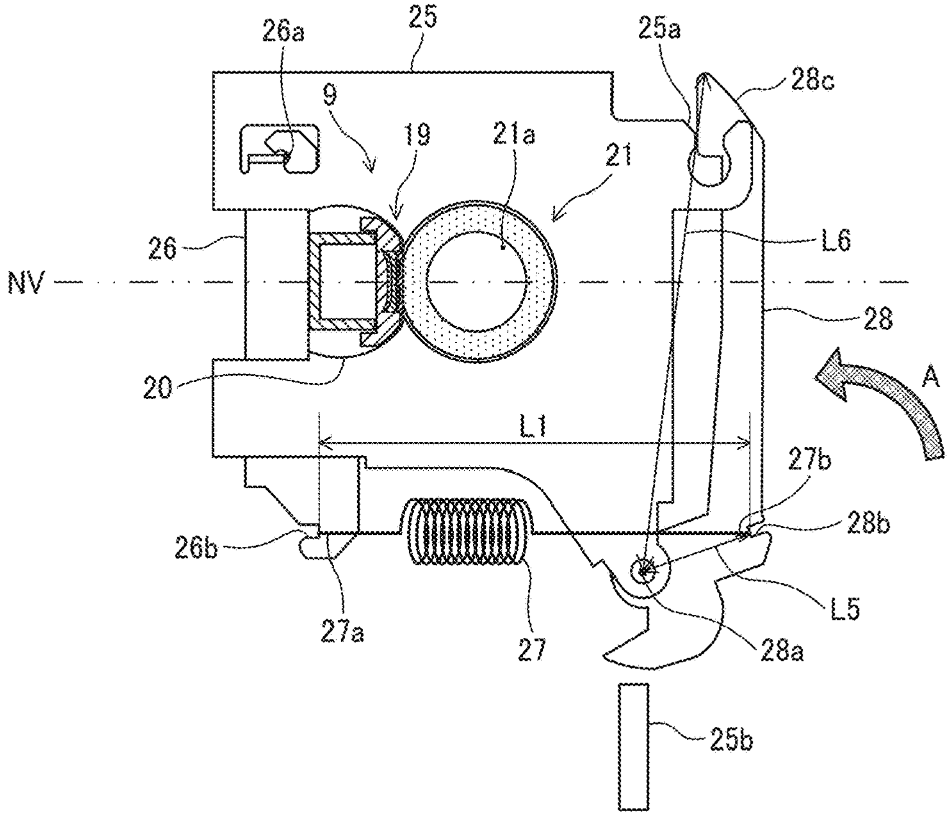
FIG. 3 is a diagram illustrating a configuration of a pressure switching mechanism used in the fixing device at the time of pressing.
Figure 4:
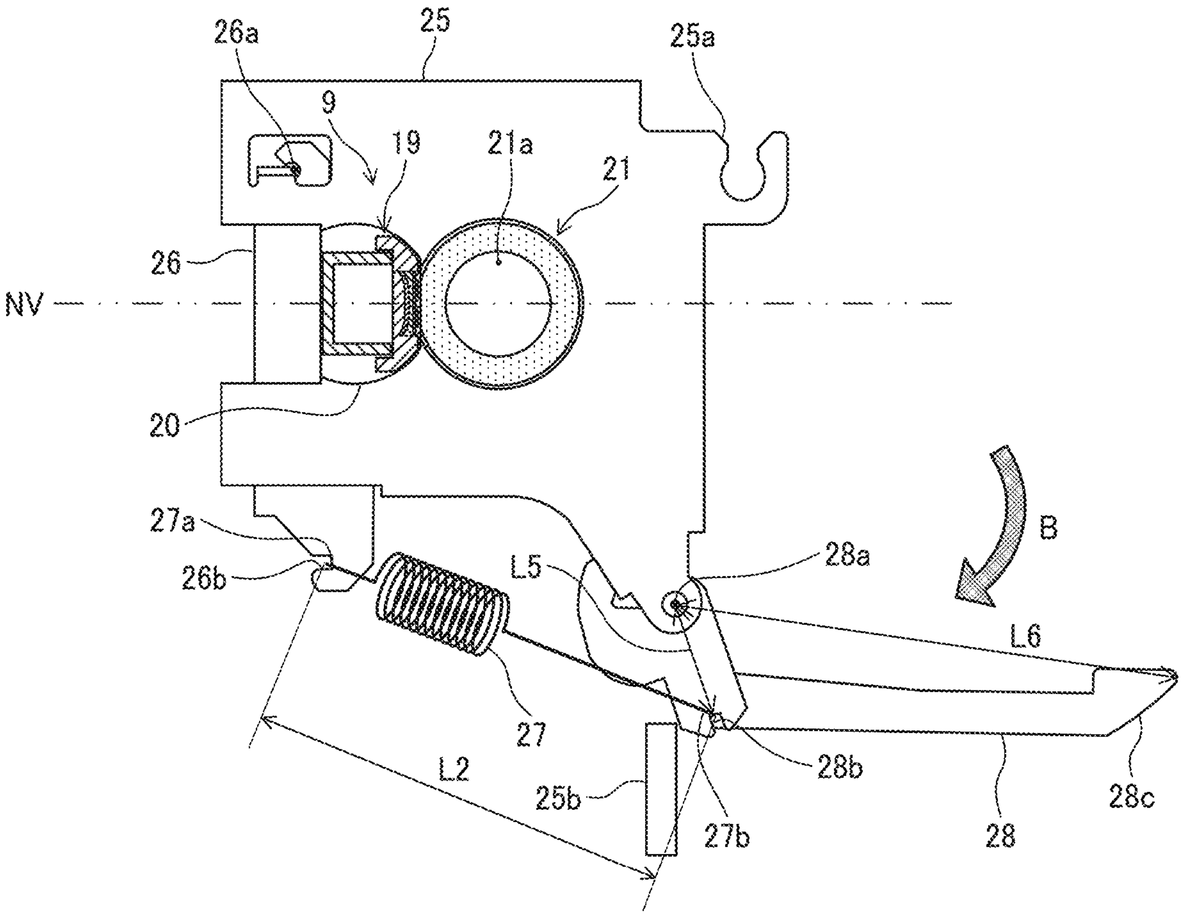
FIG. 4 is a diagram illustrating a configuration of the pressure switching mechanism used in the fixing device at the time of releasing.
Figure 5:
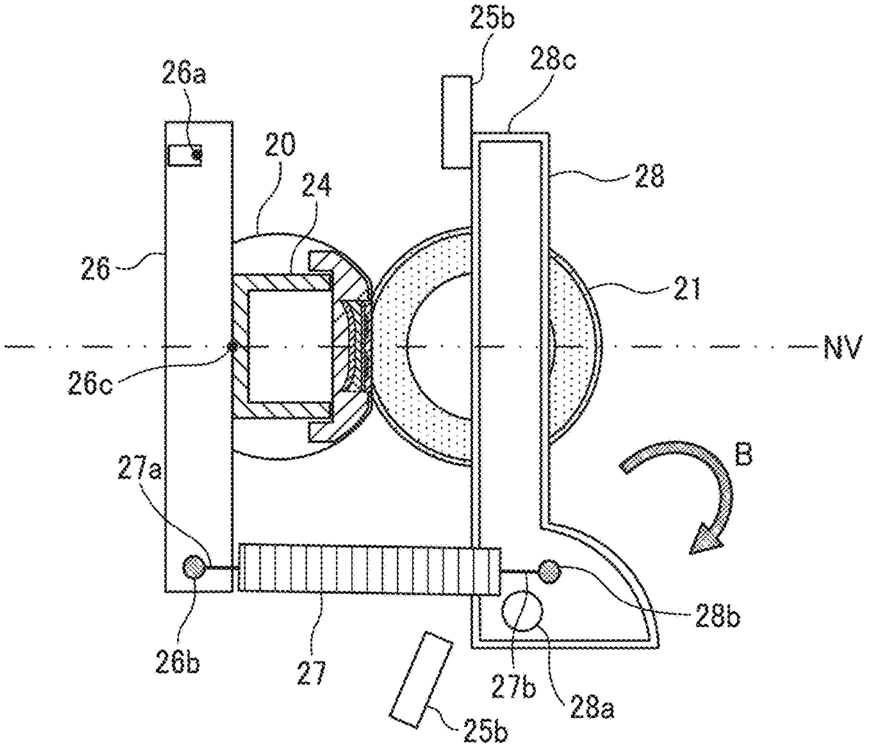
FIG. 5 is a schematic view of the pressure switching mechanism.
Figure 6:
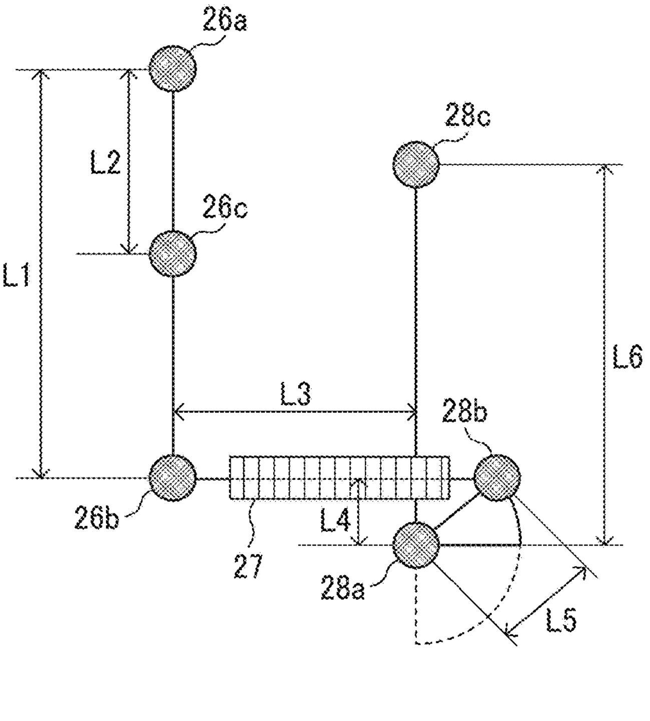
FIG. 6 is a diagram illustrating lengths L1 to L6 in various positions in the pressure switching mechanism.

FIGS. 3 and 4 are diagrams illustrating a configuration and operation of a pressure switching mechanism used in the fixing device 9 of the present embodiment. FIG. 5 is a schematic view of the pressure switching mechanism of the present embodiment. FIG. 6 is a diagram illustrating lengths L1 to L6 in various positions in the pressure switching mechanism of the present embodiment. FIGS. 3, 5, and 6 illustrate a state of the pressure switching mechanism at the time of pressing. FIG. 4 illustrates a state of the pressure switching mechanism at the time of releasing.

In the present embodiment, the core 21*a* of the pressure roller 21 is rotatably supported by a fixing frame 25 of a body of the fixing device 9. The stay 24 that presses the fixing belt 20 against the pressure roller 21 is supported by a pressure lever 26 as a supporting rotation member or a rotatable support that is rotatable around a first rotation shaft 26*a*.

A hook groove is formed in one end of the pressure lever 26. The hook groove is hooked on the fixing frame 25 so that the pressure lever 26 can rotate around the hooked portion serving as the first rotation shaft 26*a*. A spring mount 26*b* serving as a biased portion, to which one end 27*a* of the tension spring 27 serving as a biasing member is attached, is disposed on the other end of the pressure lever 26. When viewed from an axial direction of the first rotation shaft 26*a*, the spring mount 26*b* is positioned on the side opposite the first rotation shaft 26*a* with respect to a virtual line (hereinafter, referred to as a "nip normal line") NV passing through a contact portion (fixing nip N) between the fixing belt 20 and the pressure roller 21 and parallel to the pressing direction at the time of pressing. The pressure lever 26 supports the stay 24 at a point (stay pressing point) between the first rotation shaft 26*a* and the spring mount 26*b*.

With such a configuration, at the time of pressing, the tension spring 27 applies a biasing force in a direction (in the counterclockwise direction in FIG. 3) in which the pressure lever 26 rotates around the first rotation shaft 26*a* to press the fixing belt 20 against the pressure roller 21. The pressure lever 26 biases the stay 24 that supports the pressure lever 26 at a stay pressure point 26*c* toward the pressure roller 21 with this biasing force. As a result, the stay 24 presses the fixing belt 20 against the pressure roller 21 to form the fixing nip N.

The other end 27*b* of the tension spring 27 is attached to a spring mount 28*b* of a pressure release lever 28 serving as a switching rotation member. The pressure release lever 28 rotates around a second rotation shaft 28*a* parallel to the first rotation shaft 26*a* between a pressing rotation position (the rotation position in FIG. 3) at which the biasing force of the tension spring 27 is increased and a releasing rotation position (the rotation position in FIG. 4) at which the biasing force of the tension spring 27 is decreased. Note that the pressure release lever 28 is preferably formed of a single member, but may have a configuration in which a plurality of members are combined.

When the pressure release lever 28 is located at the pressing rotation position (the rotation position in FIG. 3), the spring length of the tension spring 27 is L1. When the pressure release lever 28 is located at the releasing rotation position (the rotation position in FIG. 4), the spring length of the tension spring 27 is L2 (L1>L2). That is, the pressure release lever 28 has a function to switch the spring length of the tension spring 27.

In the present embodiment, as illustrated in FIG. 3, a line connecting between the spring mount 28*b* of the pressure release lever 28 and the spring mount 26*b* of the pressure lever 26 is positioned on the same side as the stay pressure point 26*c* (see FIG. 5) of the pressure lever 26 with respect to the second rotation shaft 28*a* at the time of pressing. Accordingly, the pressure release lever 28 receives the biasing force of the tension spring 27 to rotate in the counterclockwise direction (the direction indicated by an arrow A in FIG. 3) around the second rotation shaft 28*a*. At this time, as illustrated in FIG. 3, a rotation operating end 28*c* operating the rotation of the pressure release lever 28 contacts a first rotation stopper 25*a* serving as a restricting member of the fixing frame 25, so that a further rotation is restricted. As a result, the pressure release lever 28 is held at the pressing rotation position as illustrated in FIG. 3. At this time, the spring length of the tension spring 27 is L1.

On the other hand, as illustrated in FIG. 4, a line connecting between the spring mount 28*b* of the pressure release lever 28 and the spring mount 26*b* of the pressure lever 26 is positioned on the side opposite the stay pressure point 26*c* of the pressure lever 26 with respect to the second rotation shaft 28*a* at the time of releasing. Accordingly, the pressure release lever 28 receives the biasing force of the tension spring 27 to rotate in the clockwise direction (the direction indicated by an arrow B in FIG. 4) around the second rotation shaft 28*a*. At this time, as illustrated in FIG. 4, the pressure release lever 28 contacts a second rotation stopper 25*b* disposed on the fixing frame 25, so that a further rotation is restricted. As a result, the pressure release lever 28 is held at the releasing rotation position as illustrated in FIG. 4. At this time, the spring length of the tension spring 27 is L2.

Figure 7A:
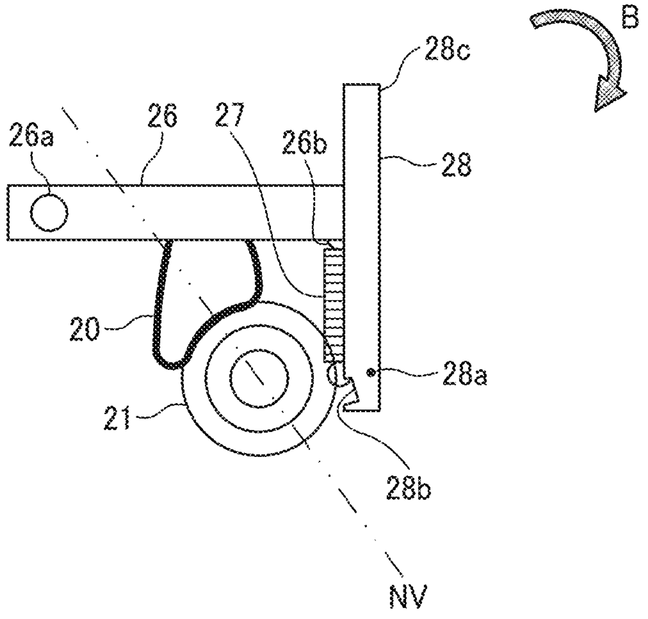
FIGS. 7A and 7B are schematic views of a pressure switching mechanism according to a comparative example.
Figure 7B:
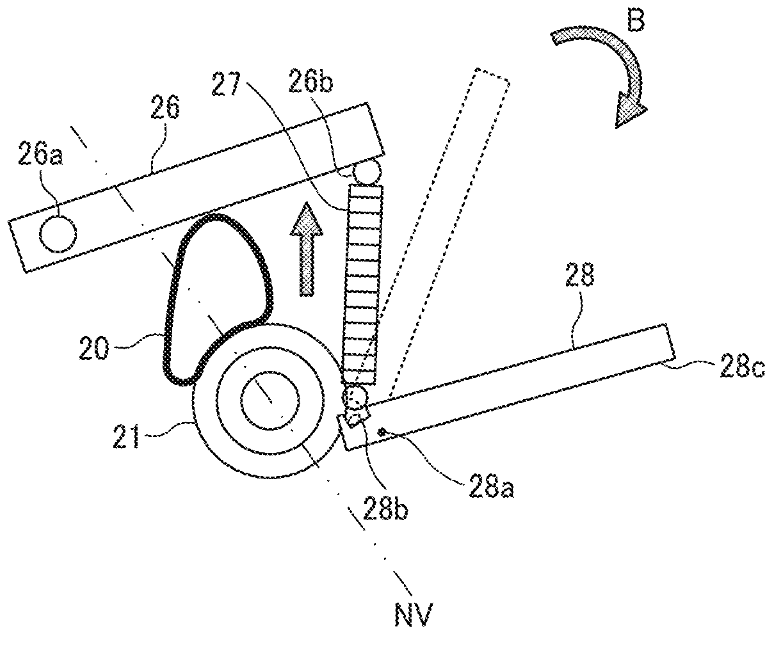

FIGS. 7A and 7B are schematic views illustrating a pressure switching mechanism according to a comparative example. As illustrated in FIG. 7A, the pressure switching mechanism according to the comparative example has a configuration in which a biasing direction of the tension spring 27 substantially matches a longitudinal direction of the pressure release lever 28 at the time of pressing. In other words, when viewed from an axial direction of the second rotation shaft 28*a*, the rotation operating end 28*c* of the pressure release lever 28 is positioned on the same side as the second rotation shaft 28*a* with respect to a nip normal NV at the time of pressing.

With such a configuration, when pressure is applied, the longitudinal direction of the pressure release lever 28 is close to the direction in which the fixing belt 20 presses the pressure roller 21. In particular, in order to effectively press the fixing belt 20 against the pressure roller 21 by the biasing force of the tension spring 27, it is preferable that the direction in which the fixing belt 20 presses the pressure roller 21 (the direction of the nip normal NV) at the time of pressing and the biasing direction of the tension spring 27 (the direction of the L1) are substantially the same. With such a preferable configuration, the longitudinal direction of the pressure release lever 28 at the time of pressing and the direction in which the fixing belt 20 presses the pressure roller 21 are substantially the same.

In a case where the required force for the rotation operation of the pressure release lever 28 is preferably reduced, for example, it is conceivable to adopt a method of lowering the spring constant of the tension spring 27 or a method of increasing a length L6 between the rotation operating end 28*c* of the pressure release lever 28 and the second rotation shaft 28*a*. However, in the case of the method of reducing the biasing force of the tension spring 27, there is a limit to reduce the spring constant of the tension spring 27 since a required nip pressure is determined. An increase in the spring length leads to an increase in the size of the fixing device 9 (pressure switching mechanism) in the spring length direction of the tension spring 27. For this reason, a method of increasing the length L6 of the pressure release lever 28 is effective.

However, when the method of increasing the length L6 of the pressure release lever 28 is adopted, the pressure switching mechanism according to the comparative example may have a disadvantage in that the size of the fixing device 9 (pressure switching mechanism) increases in the direction in which the fixing belt 20 is pressed against the pressure roller 21 (the direction of the nip normal NV) at the time of pressing.

Accordingly, in the present embodiment, as illustrated in FIGS. 3, 5, and 6, when viewed from the axial direction of the second rotation shaft 28*a*, the rotation operating end 28*c* of the pressure release lever 28 is positioned on the side opposite the second rotation shaft 28*a* with respect to the nip normal NV at the time of pressing. With such a configuration, when pressure is applied, the longitudinal direction (the direction along L6) of the pressure release lever 28 is significantly inclined or perpendicular with respect to the direction (the direction of the nip normal NV) in which the fixing belt 20 presses the pressure roller 21. As a result, even if the length L6 of the pressure release lever 28 in the longitudinal direction is increased, increasing in size of the fixing device 9 (pressure switching mechanism) in the direction of the nip normal NV can be restricted.

In addition, the size of the fixing device 9 (the pressure switching mechanism) in the direction (sheet conveyance direction) perpendicular to the pressing direction (in the direction of the nip normal line NV) of the fixing belt 20 against the pressure roller 21 is originally required to ensure the length L1 of the pressure lever 26 in the longitudinal direction. Therefore, even if the length L6 of the pressure release lever 28 in the longitudinal direction is increased, increasing in size of the fixing device 9 (pressure switching mechanism) in the direction of the nip normal NV can be restricted unless the length L6 exceeds the length L1.

As a result, in the present embodiment, even if the length L6 of the pressure release lever 28 in the longitudinal direction is increased to reduce the force required for rotation operation of the pressure release lever 28, increasing in size of the fixing device 9 (pressure switching mechanism) in the direction of the nip normal NV can be restricted.

Figure 8:
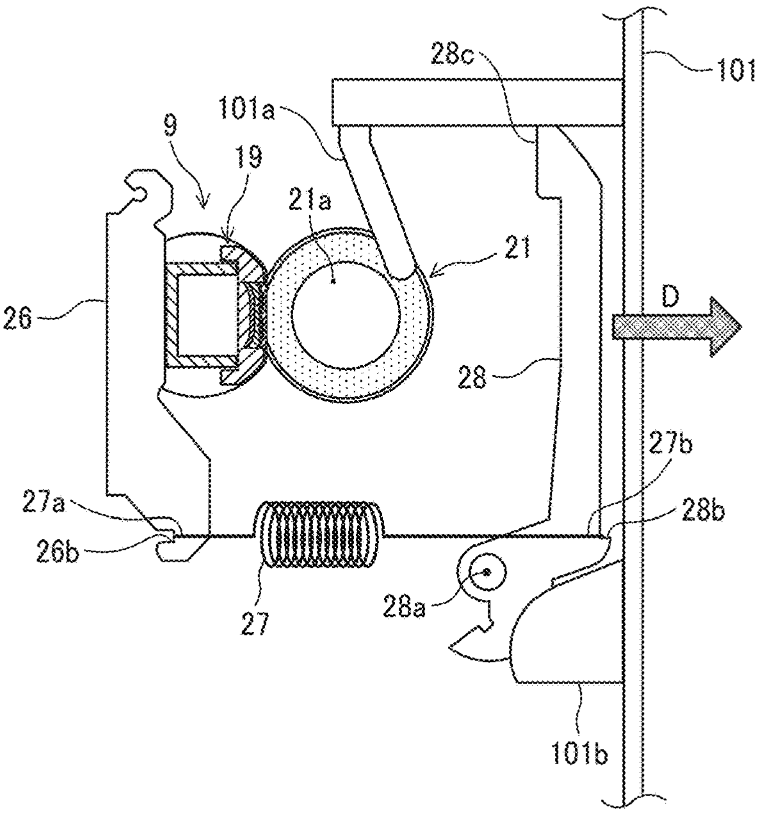
FIG. 8 is a diagram illustrating a configuration in which a pressure release lever interlocks with an open-and-close cover of the image forming apparatus, in a state where the pressure release lever is in a pressing rotation position.
Figure 9:
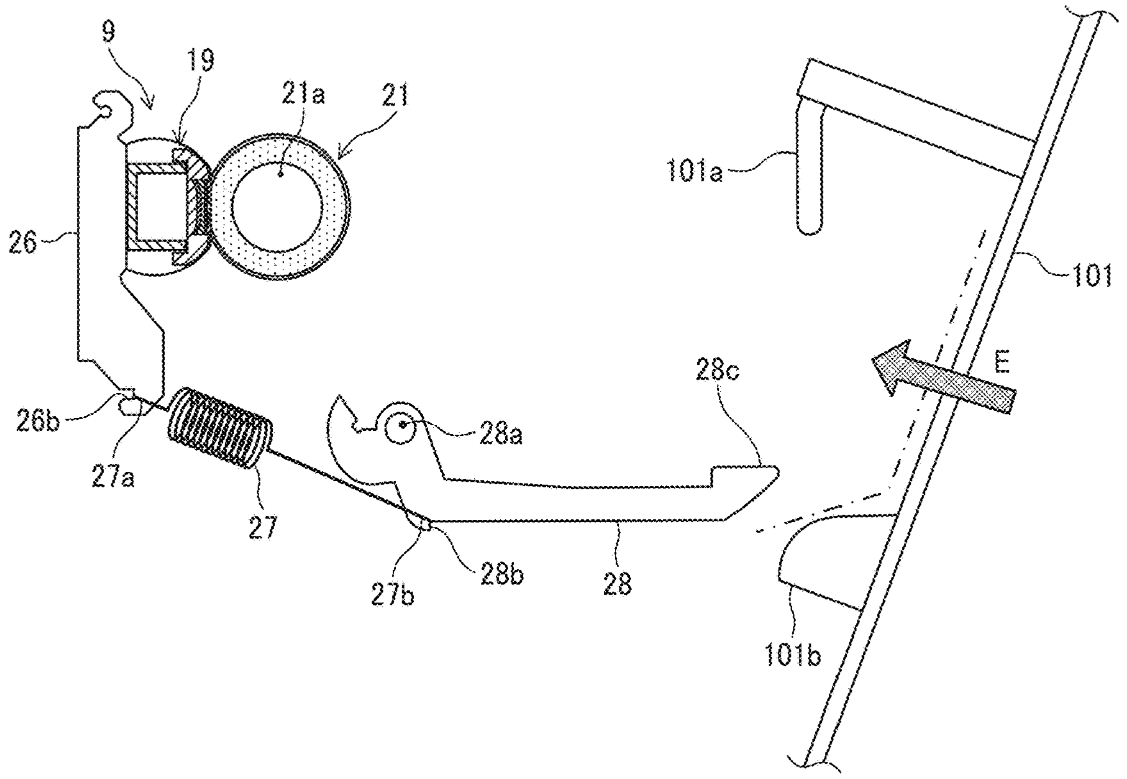
FIG. 9 is a diagram illustrating the configuration in which the pressure release lever interlocks with the open-and-close cover of the image forming apparatus, in a state where the pressure release lever is in a releasing rotation position.

FIGS. 8 and 9 are diagrams illustrating a configuration in which the pressure release lever 28 is rotated toward a pressing rotation position or a releasing rotation position in conjunction with opening or closing of an opening-and-closing cover 101 of the image forming apparatus 100. Note that FIG. 8 illustrates a state where the pressure release lever 28 is in a pressing rotation position. FIG. 4 illustrates a state where the pressure release lever 28 is in a releasing rotation position.

In the present embodiment, when the opening-and-closing cover 101 of the image forming apparatus 100 is opened from the state illustrated in FIG. 8, a pressure release portion 101*a* provided on the inner side of the opening-and-closing cover 101 is caught by the rotation operating end 28*c* of the pressure release lever 28 of the fixing device 9 in the course of the rotation (an opening operation D) of the opening-and-closing cover 101. When the opening-and-closing cover 101 is further rotated (opening operation D), the rotation operating end 28*c* of the pressure release lever 28 is pushed by the movement (rotation) of the pressure release portion 101*a*. Thus, the pressure release lever 28 is rotated from the pressing rotation position toward the releasing rotation position. As a result, when the rotation (opening operation D) of the opening-and-closing cover 101 is completed, the pressure release lever 28 is located at the releasing rotation position and turns into a releasing state as illustrated in FIG. 9.

In the present embodiment, when the opening-and-closing cover 101 of the image forming apparatus 100 is closed from the state illustrated in FIG. 9, the rotation operating end 28*c* of the pressure release lever 28 located at the releasing rotation position contacts a guide portion 101*b* disposed on the inner side of the opening-and-closing cover 101 in the course of the rotation (a closing operation E) of the opening-and-closing cover 101. Thereafter, when the opening-and-closing cover 101 is further rotated (closing operation E), the pressure release lever 28 is rotated from the releasing rotation position toward the pressing rotation position while the rotation operating end 28*c* of the pressure release lever 28 slides along the inner walls of the guide portion 101*b* and the opening-and-closing cover 101. When the rotation (closing operation E) of the opening-and-closing cover 101 has completed, as illustrated in FIG. 8, the pressure release lever 28 is located at the pressing rotation position and turns into a pressing state.

Note that, in the present embodiment, a description is given of the configuration in which the pressure release lever 28 is rotated to the pressing rotation position or the releasing rotation position in conjunction with the opening operation or closing operation of the opening-and-closing cover 101 of the image forming apparatus 100. However, embodiments of the present disclosure are not limited to the configuration described above. In some embodiments, for example, a configuration may be adopted in which an operator manually operates the rotation operating end 28*c* of the pressure release lever 28 to rotate the pressure release lever 28 to the pressing rotation position or the releasing rotation position.

The pressure switching mechanism according to the present embodiment is disposed in the fixing device 9 and positioned adjacent to the heater 22 as a heat generator of the fixing device 9. In this case, when the pressure release lever 28 is disposed in an area vertically above the heater 22, the pressure release lever 28 is exposed to hot air by the heater 22 and likely to be particularly at high temperatures. In the present embodiment, as illustrated in FIG. 3, the pressure release lever 28 is disposed at a position away from the area vertically above the heater 22, specifically, in an area laterally away from the heater 22. With this configuration, the temperature of the pressure release lever 28 is less likely to be high compared to a configuration in which the pressure release lever 28 is disposed in the area vertically above the heater 22.

If the pressure release lever 28 is less likely to reach a high temperature, the condition of heat-resisting property required for the pressure release lever 28 is relaxed. As a result, the flexibility in material selection of a material for the pressure release lever 28 increases. For example, a material having low heat resistance but high strength can be selected. As the pressure release lever 28, for example, a lever made of resin can be suitably used.

In the present embodiment, when the pressure release lever 28 is at the releasing rotation position, the rotation operating end 28*c* is disposed at a position lower than the position when the pressure release lever 28 is at the pressing rotation position. In such a configuration, as illustrated in FIG. 4, if an object drops on the pressure release lever 28 or a load is applied from above to the pressure release lever 28 when the pressure release lever 28 is located at the releasing rotation position, the pressure release lever 28 does not rotate due to contact with the second rotation stopper 25*b*. Thus, the pressure release lever 28 may be damaged.

In a case where such damage may occur, when the pressure release lever 28 is in the releasing rotation position, the rotation operating end 28*c* may be positioned at a position higher than the position when the pressure release lever 28 is in the pressing rotation position. With such a configuration, if an object drops on the pressure release lever 28 or a load is applied from above to the pressure release lever 28 when the pressure release lever 28 is located at the releasing rotation position, the pressure release lever 28 can rotate toward the pressing rotation position. Thus, the pressure release lever 28 can be prevented from being damaged.

The above-described embodiments are given as examples, and, for example, the following aspects of the present disclosure may have advantageous effects described below.

First Aspect

In a first aspect, a pressure switching mechanism (e.g., the fixing device 9) that switches between pressing and releasing of a contact member (e.g., the fixing belt 20) with respect to a contacted member (e.g., the pressure roller 21) includes a supporting rotation member (or a rotatable support such as the pressure lever 26), a biasing member (e.g., the tension spring 27), and a switching rotation member (e.g., the pressure release lever 28). The supporting rotation member (e.g., the pressure lever 26) rotates around a first rotation shaft (e.g., the first rotation shaft 26*a*) to support the contact member (e.g., the fixing belt 20) such that the contact member (e.g., the fixing belt 20) is movable in a direction toward or away from the contacted member (e.g., the pressure roller 21). The biasing member (e.g., the tension spring 27) has one end (e.g., the end 27*a*) connected to a biased portion (e.g., the spring mount 26*b*) of the supporting rotation member (e.g., the pressure lever 26). The biased portion is located on a side opposite the first rotation shaft (e.g., the first rotation shaft 26*a*) with respect to a virtual line (e.g., the nip normal NV) when viewed from an axial direction of the first rotation shaft. The virtual line passes through a contact portion (e.g., the fixing nip N) between the contact member (e.g., the fixing belt 20) and the contacted member (e.g., the pressure roller 21) at the pressing of the contact member with respect to a contacted member and is parallel to a pressing direction. The biasing member applies a biasing force to the supporting rotation member (e.g., the pressure lever 26) to rotate the supporting rotation member (e.g., the pressure lever 26) in a direction such that the contact member (e.g., the fixing belt 20) contacts the contacted member (e.g., the pressure roller 21). The switching rotation member (e.g., the pressure release lever 28) is connected to the other end (e.g., the end 27*b*) of the biasing member (e.g., the tension spring 27) opposite the one end (e.g., the end 27*a*) of the biasing member (e.g., the tension spring 27). The switching rotation member (e.g., the pressure release lever 28) rotates around a second rotation shaft (e.g., the second rotation shaft 28*a*) between a pressing rotation position to increase the biasing force of the biasing member (e.g., the tension spring 27) and a releasing rotation position to decrease the biasing force of the biasing member (e.g., the tension spring 27). The second rotation shaft (e.g., the second rotation shaft 28*a*) is parallel to the first rotation shaft (e.g., the first rotation shaft 26*a*). The switching rotation member (e.g., the pressure release lever 28) has a rotation operating end (e.g., the rotation operating end 28*c*) to operate rotation of the switching rotation member (e.g., the pressure release lever 28). The rotation operating end (e.g., the rotation operating end 28*c*) is on a side opposite to the second rotation shaft (e.g., the second rotation shaft 28*a*) with respect to the virtual line (e.g., the nip normal NV) when viewed from an axial direction of the second rotation shaft (e.g., the second rotation shaft 28*a*) at the pressing rotation position. The supporting rotation member (e.g., the pressure lever 26) rotates around the first rotation shaft (e.g., the first rotation shaft 26*a*) to support the contact member (e.g., the fixing belt 20) such that the contact member (e.g., the fixing belt 20) is movable in a direction toward or away from the contacted member (e.g., the pressure roller 21). One end of the biasing member (e.g., the tension spring 27) is attached to the biased portion (e.g., the spring mount 26*b*) of the supporting rotation member (e.g., the pressure lever 26). When viewed from the axial direction of the first rotation shaft (e.g., the first rotation shaft 26*a*), the biased portion (e.g., the spring mount 26*b*) is located on the side opposite the first rotation shaft (e.g., the first rotation shaft 26*a*) with respect to the virtual line (e.g., the nip normal NV) parallel to the pressing direction and passing through the contact portion (e.g., the fixing nip N) between the contact member (e.g., the fixing belt 20) and the contacted member (e.g., the pressure roller 21) at the time of pressing. The other end of the biasing member (e.g., the tension spring 27) is coupled to the switching rotation member (e.g., the pressure release lever 28). When the rotation operating end (e.g., the rotation operating end 28*c*) of the switching rotation member (e.g., the pressure release lever 28) is operated to rotate around the second rotation shaft (e.g., the second rotation shaft 28*a*), the switching rotation member (e.g., the pressure release lever 28) can occupy the pressing rotation position at which the biasing force of the biasing member (e.g., the tension spring 27) is increased and the releasing rotation position at which the biasing force of the biasing member (e.g., the tension spring 27) is decreased. With such a configuration, in order to effectively press the contact member (e.g., the fixing belt 20) against the contacted member (e.g., the pressure roller 21) by the biasing force of the biasing member (e.g., the tension spring 27), the pressing direction of the contact member (e.g., the fixing belt 20) against the contacted member (e.g., the pressure roller 21) and the biasing direction of the biasing member (e.g., the tension spring 27) are directed in substantially the same direction. For example, in the pressure switching mechanism according to the comparative example described above, the biasing direction of the biasing member (e.g., the tension spring 27) substantially coincides with the longitudinal direction of the switching rotation member (e.g., the pressure release lever 28), which is a direction substantially passing through the rotation operating end (e.g., the rotation operating end 28*c*) of the switching rotation member (e.g., the pressure release lever 28) and a connected portion to which the second rotation shaft (e.g., the second rotation shaft 28*a*) and the other end of the biasing member (e.g., the tension spring 27) are coupled at the time of pressing. Accordingly, the longitudinal direction of the switching rotation member (e.g., the pressure release lever 28) at the time of pressing substantially coincides with the pressing direction of the contact member (e.g., the fixing belt 20) against the contacted member (e.g., the pressure roller 21). As the distance (length) between the rotation operating end (e.g., the rotation operating end 28*c*) of the switching rotation member (e.g., the pressure release lever 28) and the second rotation shaft (e.g., the second rotation shaft 28*a*) is increased, that is, as the length of the switching rotation member (e.g., the pressure release lever 28) in the longitudinal direction is increased, the force required for the rotation operation of the switching rotation member (e.g., the pressure release lever 28) can be reduced. However, in the pressure switching mechanism according to the comparative example, as described above, the longitudinal direction of the switching rotation member (e.g., the pressure release lever 28) at the time of pressing substantially coincides with the pressing direction of the contact member (e.g., the fixing belt 20) with respect to the contacted member (e.g., the pressure roller 21). Accordingly, if the length of the switching rotation member (e.g., the pressure release lever 28) in the longitudinal direction is increased, the dimension of the pressure switching mechanism in the pressing direction may increase. In the first aspect, as viewed from the axial direction of the second rotation shaft (e.g., the second rotation shaft 28*a*), the rotation operating end (e.g., the rotation operating end 28*c*) of the switching rotation member (e.g., the pressure release lever 28) is positioned on the side opposite the second rotation shaft (e.g., the second rotation shaft 28*a*) with respect to the virtual line (e.g., the nip normal NV), which is a virtual line passing through the contact portion (e.g., the fixing nip N) between the contact member (e.g., the fixing belt 20) and the contacted member (e.g., the pressure roller 21) and parallel to the direction of pressing at the time of pressing. With such a configuration, the longitudinal direction of the switching rotation member (e.g., the pressure release lever 28) at the time of pressing is inclined or perpendicular to the direction in which the contact member (e.g., the fixing belt 20) presses the contacted member (e.g., the pressure roller 21). As a result, even if the length of the switching rotation member (e.g., the pressure release lever 28) in the longitudinal direction is increased, an increase in the dimension of the pressure switching mechanism in the pressing direction is restricted.

Second Aspect

In a second aspect, the pressure switching mechanism (e.g., the fixing device 9) according to the first aspect further includes a stopper (e.g., the first rotation stopper 25*a*) that restricts rotation of the switching rotation member (e.g., the pressure release lever 28) toward a direction opposite to the releasing rotation position when the switching rotation member (e.g., the pressure release lever 28) is located at the pressing rotation position. A biasing force of the biasing member (e.g., the tension spring 27) rotates the switching rotation member (e.g., the pressure release lever 28) toward the direction opposite to the releasing rotation position when the switching rotation member (e.g., the pressure release lever 28) is located at the pressing rotation position. With this configuration, the switching rotation member (e.g., the pressure release lever 28) can be stably held at the pressing rotation position by the biasing force of the biasing member (e.g., the tension spring 27).

Third Aspect

In a third aspect, in the pressure switching mechanism (e.g., the fixing device 9) according to the first or second aspect, the switching rotation member (e.g., the pressure release lever 28) is formed of a single member. According to this configuration, the number of parts and components is reduced.

Fourth Aspect

In a fourth aspect, in the pressure switching mechanism (e.g., the fixing device 9) according to any one of the first to third aspects, the biasing member (e.g., the tension spring 27) is disposed in an area vertically above or below the contact portion (e.g., the fixing nip N). With this configuration, the switching rotation member (e.g., the pressure release lever 28) is disposed such that the longitudinal direction of the switching rotation member is oriented substantially vertical direction. Thus, an increase of the dimension in the height direction of the pressure switching mechanism can be restricted.

Fifth Aspect

In a fifth aspect, in the pressure switching mechanism (e.g., the fixing device 9) according to any one of the first to fourth aspects, a position of the rotation operating end (e.g., the rotation operating end 28*c*) when the switching rotation member (e.g., the pressure release lever 28) is at the releasing rotation position is higher than a position of the rotation operating end (e.g., the rotation operating end 28*c*) when the switching rotation member (e.g., the pressure release lever 28) is at the pressing rotation position. With this configuration, even in a case where an object drops on the switching rotation member (e.g., the pressure release lever 28) or a load is applied from above to the switching rotation member (e.g., the pressure release lever 28) when the switching rotation member (e.g., the pressure release lever 28) is located at the pressing rotation position, the switching rotation member (e.g., the pressure release lever 28) can rotate toward the pressing rotation position. Thus, the switching rotation member (e.g., the pressure release lever 28) can be prevented from being damaged.

Sixth Aspect

In a sixth aspect, an image forming apparatus (e.g., the image forming apparatus 100) includes the pressure switching mechanism (e.g., the fixing device 9) according to any one of the first to fifth aspects. With this configuration, an increase in size of the image forming apparatus (e.g., the image forming apparatus 100) can be restricted in the pressing direction of the contact member (e.g., the fixing belt 20) against the contacted member (e.g., the pressure roller 21).

Seventh Aspect

In a seventh aspect, the image forming apparatus (e.g., the image forming apparatus 100) according to the sixth aspect further includes an opening-and-closing cover (e.g., the opening-and-closing cover 101) of a body (e.g., the body 103) of the image forming apparatus (e.g., the image forming apparatus 100) and has at least one of a configuration in which the switching rotation member (e.g., the pressure release lever 28) rotates from the pressing rotation position to the releasing rotation position in conjunction with an opening operation of the opening-and-closing cover (e.g., the opening-and-closing cover 101) and a configuration in which the switching rotation member (e.g., the pressure release lever 28) rotates from the releasing rotation position to the pressing rotation position in conjunction with a closing operation of the opening-and-closing cover (e.g., the opening-and-closing cover 101). With this configuration, the rotation operation of the switching rotation member (e.g., the pressure release lever 28) can be performed in conjunction with the opening operation and the closing operation of the opening-and-closing cover (e.g., the opening-and-closing cover 101) of the body (e.g., the body 103) of the image forming apparatus (e.g., the image forming apparatus 100). Thus, such a configuration can obviate the need for performing the operation of rotating the switching rotation member (e.g., the pressure release lever 28) separately from the opening operation and the closing operation of the opening-and-closing cover (e.g., the opening-and-closing cover 101).

Eighth Aspect

In an eighth aspect, in the image forming apparatus (e.g., the image forming apparatus 100) according to the sixth or seventh aspect, the pressure switching mechanism (e.g., the fixing device 9) is disposed adjacent to the heat generator (e.g., the heater 22) in the body (e.g., the body 103) of the image forming apparatus (e.g., the image forming apparatus 100), and the switching rotation member (e.g., the pressure release lever 28) is disposed at a position away from an area vertically above the heat generator (e.g., the heater 22). With this configuration, the switching rotation member (e.g., the pressure release lever 28) is not likely to reach high temperature as compared to a configuration in which the switching rotation member (e.g., the pressure release lever 28) is disposed in the area vertically above the heat generator (e.g., the heater 22). The condition for heat resistance required for the switching rotation member (e.g., the pressure release lever 28) is relaxed. Thus, the flexibility in material selection of the switching rotation member (e.g., the pressure release lever 28) increases.

Nineth Aspect

In a ninth aspect, in the image forming apparatus (e.g., the image forming apparatus 100) according to any one of the sixth to eighth aspects, the switching rotation member (e.g., the pressure release lever 28) is made of resin. With this configuration, the switching rotation member (e.g., the pressure release lever 28) made of resin can be provided.

The above-described embodiments are illustrative and do not limit the present disclosure. Thus, numerous additional modifications and variations are possible in light of the above teachings. For example, elements and/or features of different illustrative embodiments may be combined with each other and/or substituted for each other within the scope of the present disclosure.

The invention claimed is:

1. A pressure switching mechanism configured to switch between a pressing and a releasing of a contact member with respect to a contacted member, the pressure switching mechanism comprising:

a rotatable support configured to rotate around a first rotation shaft, and the rotatable support further configured to support the contact member and a planar heater at an inner circumferential surface side of the contact member to be movable in a direction toward or away from the contacted member, wherein the planar heater is configured to heat the inner circumferential surface side of the contact member to a planar shape and the contacted member is configured to press an outer circumferential surface side of the contact member, in response to the planar heater being moved in the direction toward the contacted member;

a biasing member having one end connected to a biased portion of the rotatable support, the biased portion located on a side opposite the first rotation shaft with respect to a virtual line when viewed from an axial direction of the first rotation shaft, the virtual line passing through a contact portion between the contact member and the contacted member at the pressing of the contact member with respect to the contacted member, the virtual line parallel to a pressing direction in which the contact member presses the contacted member, the biasing member configured to apply a biasing force to the rotatable support to rotate the rotatable support in a direction such that the contact member presses the contacted member;

a switching rotation member connected to another end of the biasing member opposite the one end of the biasing member, the switching rotation member configured to rotate around a second rotation shaft between a pressing rotation position to increase the biasing force of the biasing member and a releasing rotation position to decrease the biasing force of the biasing member, the second rotation shaft parallel to the first rotation shaft, the switching rotation member having a rotation operating end configured to operate rotation of the switching rotation member, wherein the rotation operating end is on a side opposite the second rotation shaft with respect to the virtual line when viewed from an axial direction of the second rotation shaft at the pressing rotation position; and a stopper configured to restrict rotation of the switching rotation member in a direction opposite to a direction toward the releasing rotation position in response to the switching rotation member being at the pressing rotation position, wherein in response to the switching rotation member being at the pressing rotation position, the biasing force of the biasing member biases the switching rotation member in the direction opposite to the direction toward the releasing rotation position, the biasing member extends in a first direction in the pressing rotation position and the biasing member extends in a second direction in the releasing rotation position, an angle between the first direction and the virtual line in the pressing rotation position is less than an angle between the second direction and the virtual line in the releasing rotation position, and a position of the rotation operating end when the switching rotation member is at the releasing rotation position is lower than a position of the rotation operating end when the switching rotation member is at the pressing rotation position.

2. The pressure switching mechanism according to claim 1, wherein the switching rotation member includes a single member.

3. The pressure switching mechanism according to claim 1, wherein the biasing member is in an area vertically above or below the contact portion.

4. An image forming apparatus comprising the pressure switching mechanism according to claim 1.

5. The image forming apparatus according to claim 4, further comprising a cover of a body of the image forming apparatus, wherein the image forming apparatus has at least one of a configuration in which the switching rotation member rotates from the pressing rotation position to the releasing rotation position in conjunction with an opening operation of the cover and a configuration in which the switching rotation member rotates from the releasing rotation position to the pressing rotation position in conjunction with a closing operation of the cover.

6. The image forming apparatus according to claim 4, wherein the pressure switching mechanism is adjacent to the planar heater in a body of the image forming apparatus, and wherein the switching rotation member is at a position away from an area vertically above the planar heater.

7. The image forming apparatus according to claim 4, wherein the switching rotation member includes resin.

8. A pressure switching mechanism configured to switch between a pressing and a releasing of a fixing belt with respect to a pressure roller, the pressure switching mechanism comprising:

a pressure lever configured to rotate around a first rotation shaft, and the pressure lever further configured to support the fixing belt and a planar heater at an inner circumferential surface side of the fixing belt to be movable in a direction toward or away from the pressure roller;

a biasing spring having one end connected to a biased portion of the pressure lever, the biasing spring configured to apply a biasing force to the pressure lever to rotate the pressure lever in a direction such that the fixing belt presses the pressure roller;

a pressure release lever connected to another end of the biasing spring opposite the one end of the biasing spring, the pressure release lever configured to rotate around a second rotation shaft between a pressing rotation position to increase the biasing force of the biasing spring and a releasing rotation position to decrease the biasing force of the biasing spring, the second rotation shaft parallel to the first rotation shaft, the pressure release lever having a rotation operating end configured to operate rotation of the pressure release lever, wherein the rotation operating end is on a side opposite the second rotation shaft; and a stopper configured to restrict rotation of the pressure release lever in a direction opposite to a direction toward the releasing rotation position in response to the pressure release lever being at the pressing rotation position, wherein in response to the pressure release lever being at the pressing rotation position, the biasing force of the biasing spring biases the pressure release lever in the direction opposite to the direction toward the releasing rotation position, the biasing spring extends in a first direction in the pressing rotation position and the biasing spring extends in a second direction in the releasing rotation position, and an angle between the first direction and a virtual line in the pressing rotation position is less than an angle between the second direction and the virtual line in the releasing rotation position, wherein the virtual line passes through a contact portion between the fixing belt and the pressure roller at the pressing of the fixing belt with respect to the pressure roller, and wherein a position of the rotation operating end when the pressure release lever is at the releasing rotation position is lower than a position of the rotation operating end when the pressure release lever is at the pressing rotation position.

9. The pressure switching mechanism according to claim 8, wherein the pressure release lever comprises a single member.

10. An image forming apparatus comprising the pressure switching mechanism according to claim 8.

11. The image forming apparatus according to claim 10, further comprising a cover of a body of the image forming apparatus, wherein the image forming apparatus has at least one of a configuration in which the pressure release lever rotates from the pressing rotation position to the releasing rotation position in conjunction with an opening operation of the cover and a configuration in which the pressure release lever rotates from the releasing rotation position to the pressing rotation position in conjunction with a closing operation of the cover.

12. The image forming apparatus according to claim 10, wherein the pressure switching mechanism is adjacent to the planar heater in a body of the image forming apparatus, and wherein the pressure release lever is at a position away from an area vertically above the planar heater.

13. The image forming apparatus according to claim 10, wherein the pressure release lever includes resin.

* * * * *